G. W. COLLIN.
BOILER CUT-OFF SYSTEM.
APPLICATION FILED JULY 13, 1914.
1,136,211.
Patented Apr. 20, 1915.
2 SHEETS—SHEET 1.
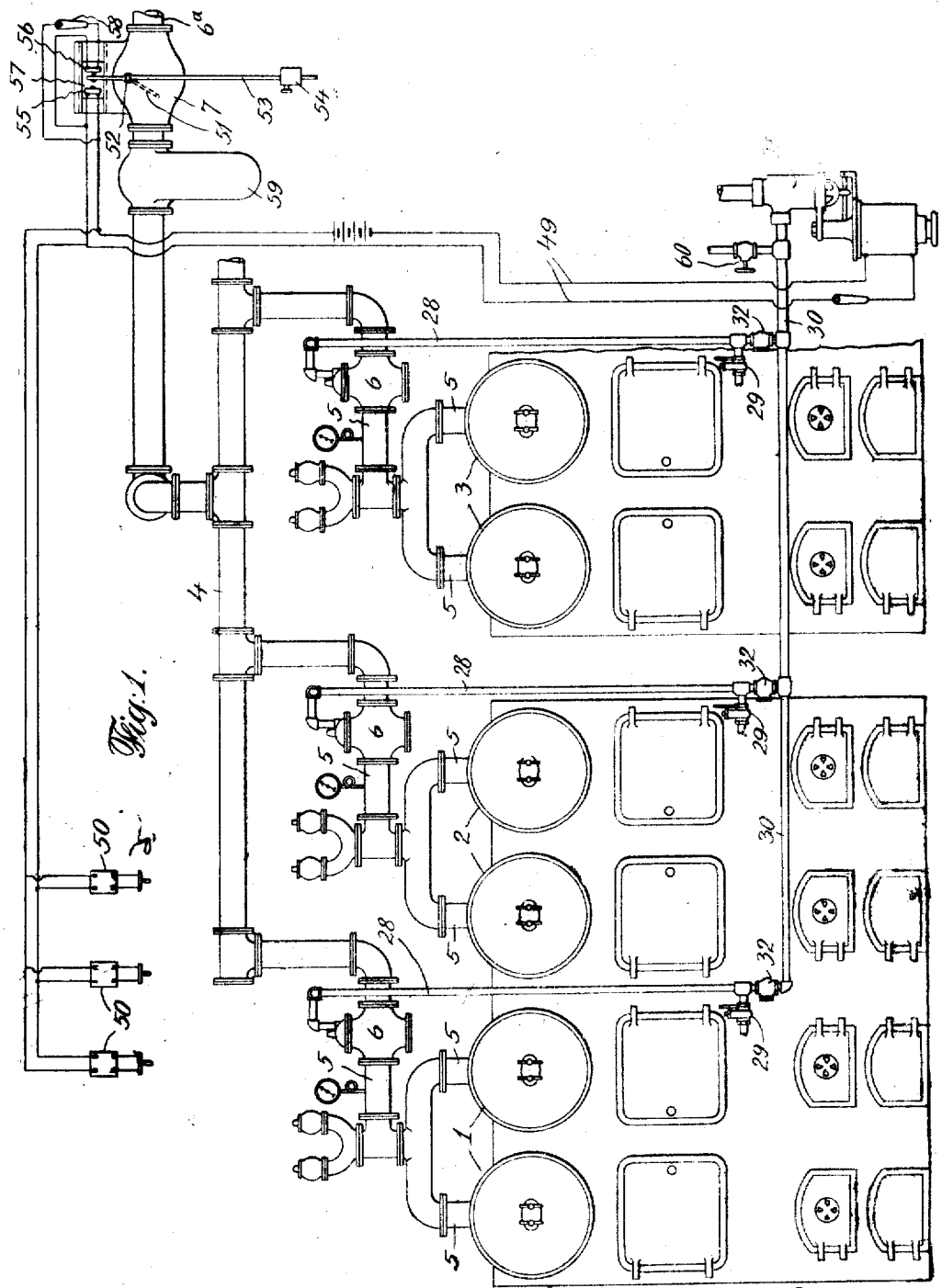

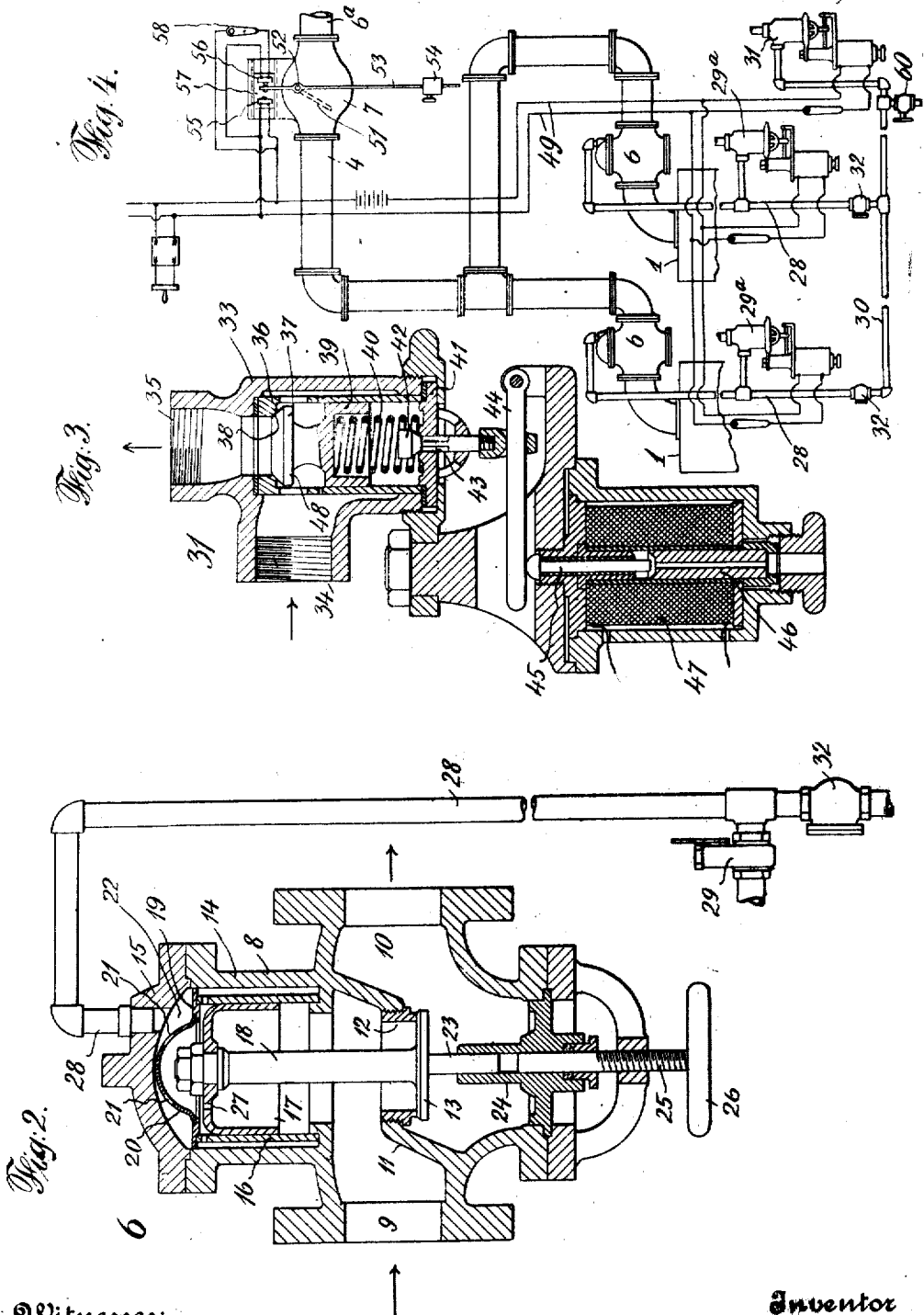

UNITED STATES PATENT OFFICE.

GEORGE W. COLLIN, OF BRIDGEPORT, CONNECTICUT.

BOILER-CUT-OFF SYSTEM.

1,136,211.  Specification of Letters Patent.  Patented Apr. 20, 1915.

Application filed July 13, 1914. Serial No. 850,839.

*To all whom it may concern:*

Be it known that I, GEORGE W. COLLIN, a citizen of the United States of America, and a resident of Bridgeport, in the county of Fairfield and State of Connecticut, have invented a certain new and useful Boiler-Cut-Off System, of which the following is a specification.

My invention relates to a boiler cut off system; and while applicable to a single boiler, is particularly intended for application to a group or gang of boilers; also to any container or containers of fluid pressure, for example, compressed air tanks; and in terming this invention a "boiler cut off system" I do not mean, by the use of the term "boiler" in such title, to limit my invention to its application to steam boilers; the term "boiler" is used in the title simply because the invention will be used most commonly in connection with steam boilers and such title is the title which would ordinarily be applied to it by persons skilled in the art.

My invention comprises means whereby the flow of steam or other fluid under pressure from a boiler or other pressure-container, may be cut off, readily and easily, either manually or automatically, and whereby, in the case of a group or gang of pressure-containers to which my invention is applied, any one of such group or gang may be cut off, at will, or the whole gang may be cut off either manually or automatically, whenever conditions, making such cutting off desirable, arise.

It not infrequently happens, in the operation of steam plants or other plants involving the use of pressure-containers, that occasion arises for the instantaneous shutting off of flow from such container or containers. Thus, a break may occur in a pipe line through which the fluid under pressure is being conveyed, or a vessel to which such fluid is being conveyed may rupture, or an engine to which steam or other fluid under pressure is being supplied may race. Under all of these conditions it is desirable to shut off the flow from the pressure containers instantaneously, and it is frequently necessary, or desirable, under such conditions, that the act accomplishing this shutting off shall be performed at some distant point. The mere hand-closing of an ordinary throttle valve, such as is commonly provided in pipe lines, is not sufficiently prompt. Moreover, it frequently happens that a hand operated throttle valve, though present in the pipe line, is not accessible immediately; there may be such an escape of steam in the immediate vicinity of this valve as to make it impossible or very dangerous to go near the valve; and in the case of a racing engine it frequently happens that, through the bursting of a fly wheel, it is impossible for the engine attendant to go near the engine because of masses of metal being thrown with high velocity from the engine. In the case of boilers, the splitting or bursting of a tube or flue, or the rupture of the boiler shell or crown sheet, or other part exposed to pressure, may necessitate the cutting off of that boiler; and yet the flow of steam or hot water may make it impossible to go near the boiler. In the case of a gang of boilers, when such an accident occurs, such accident is usually, in the first instance at least, in one boiler only, and if this boiler can be shut off quickly, the operation of the other boilers may be continued, often without any shutting down of the plant; whereas if the damaged boiler be not shut off instantly, the steam from the other boilers may blow back through the damaged boiler thus increasing the damage in and around the damaged boiler, and at the same time subjecting the heretofore undamaged boilers to injury due to the very sudden decrease in pressure in those boilers. Many serious and distressing accidents have occurred on land, and particularly on ship board, due to the giving away at first, of a minor part of one boiler only, followed by blowing back through that boiler of the steam of other connected boilers; and very many lives have been lost through inability to instantly shut off the flow of steam from a boiler or from a gang of boilers, from a distant point, immediately upon the occurrence of some accident.

The objects of my invention are to provide for the cutting off instantly of a boiler or other pressure container, or of any one or more or all of a group or gang of boilers or pressure containers; to make the main operating device of such boiler cut off means capable of easy and instantaneous operation, and, if desired, of operation from a distant point, also, if desired, of automatic operation; to provide for the ready testing of the system, without interference with the operation thereof, or of apparatus (steam engines for example) to which the fluid under pressure is being supplied; and to make the entire apparatus simple, compact, and relatively inexpensive.

Other objects of my invention will appear hereafter.

I will now proceed to describe my invention with reference to the accompanying drawings, and will then point out the novel features in claims.

In the drawings: Figure 1 shows more or less diagrammatically an elevation of a part of a gang of boilers provided with boiler cut off means in accordance with my invention. Fig. 2 shows a central vertical section of one of the individual boiler cut off valves. Fig. 3 shows a central vertical section of an electrically-operated "master" valve which may be employed for the actuation of the boiler cut off valves. Fig. 4 indicates, more or less diagrammatically, the employment of distant-control valves for the operation of individual boiler cut off valves, and other features as hereinafter described.

Referring first to Fig. 1, numerals 1, 2 and 3 designate individual boilers of a group or gang; 4 designates the usual header or manifold to which the boilers 1, 2 and 3 deliver steam through the usual pipe connections 5. In each, preferably, of these pipe connections 5, I provide a cut off valve 6 which may be of the construction shown in Fig. 2, though I do not limit myself to the particular cut off valve shown in Fig. 2. 6ª designates a pipe line through which steam is supplied from the header 4, and 7 designates a velocity-actuated contact device which may be provided in such pipe line 6ª.

Referring now to Fig. 2, showing one construction of cut off valve which may be employed: 8 designates the body of the valve, said valve having the usual inlet connection 9 and outlet connection 10 with a ported division wall 11 separating such inlet and outlet, the port of the division wall having within it a ported valve seat bushing 12 with which a valve disk 13 is adapted to coact. The valve casing 8 is provided on one side with an extension 14 closed at the end by a bonnet 15, there being within such extension a liner cylinder 16 within which is mounted for reciprocation a piston 17 connected to the stem 18 of the valve disk 13. The liner cylinder 16 is held in proper alinement with respect to the valve disk 13 and valve seat bushing 12 by a ring 19, the liner 16 being spaced away from the walls of the valve-casing extension 14 in order that it may have freedom for expansion and may not be warped by possible warping or change of shape of the valve casing. A member 20, preferably of spring steel or other suitable resilient material, is held, preferably under some pressure, against this ring 19, by the bonnet 15, and so holds the liner 16 and the ring 19 firmly in place. In this retainer 20 are suitable ports 21 for the passage of steam or other fluid under pressure into the chamber 22 in rear of said retainer 20. I have shown the valve disk 13 as provided also with a guide-stem 23 guided by a member 24 forming a bottom closure for the valve casing 8; and there may also be provided in this guide 24 a screw stem, 25, adapted to be actuated by a hand wheel 26, whereby, when desired, the valve disk 13 may be closed positively and held closed. The piston 17 customarily has a somewhat loose fit in the liner 16, so that fluid under pressure may pass slowly between said cylinder liner and piston into the space above the piston; or, if preferred, a small leakage port 27 may be provided in the piston. A pipe 28 leads from the space 22, above the piston, to some convenient point and is there provided with a valve 29 which, when open, will connect said pipe 28 with the atmosphere, or with other point of pressure materially lower than that maintained in the boiler or other pressure-container to which the cut off valve is connected.

In Fig. 1 I have shown the pipes 28 leading down along the fronts of their respective boilers to points convenient to the boiler attendants. The various pipes 28 are also, preferably, connected to a pipe line 30 leading to a "master valve" 31 whereby, when said valve 31 is open, the pipes 28 are vented to the atmosphere or to some other point of pressure materially lower than that maintained in the boiler or pressure containers to which the several shut off valves 6 are connected. Preferably, the pipe line 30 is of progressively increasing cross section so that there may be no backing up of pressure in it. I commonly provide a check valve 32 between each pipe 28 and the common pipe 30, such valves being arranged to open for flow from the pipes 28 into the pipe 30 but to close against flow from the pipe 30 into the pipes 28.

Various constructions of master valves 31 may be employed. I will hereinafter describe the construction of the particular master valve 31 illustrated. Assuming, for the present, that such valve 31 is one which, while normally closed, may be opened at will, and assuming that all of the boilers 1, 2, 3, illustrated in Fig. 1, are under pressure, it will be seen that upon the opening of such master valve 31 the pressure above the piston 17 of each of the cut off valves 6 will be relieved and thereby the pressure on the under side of each piston 17 will force that piston up, seating the corresponding valve disk 13 against its seat, and so shutting off all of the boilers from the header 4. It will also be seen that, with the valve 31 closed, if any one of the valves 29 be opened, the corresponding shut off valve 6 will be closed, so cutting off the boiler, to which that valve 29 and shut off valve 6 pertain, from the header 4. It will further be seen that, since each valve 6 is in effect a check valve, if any one of the boilers should be ruptured, back flow of steam from another boiler or boilers into that boiler which has ruptured will cause the closing of the shut off valve 6 of the ruptured boiler, so preventing other boilers from blowing off through the ruptured boiler. Such closing of the cut off valve of the ruptured boiler will occur independent of any actuation of valves 29 and 31. It will also be seen that, since the rate of steam delivery from any one boiler of the gang is constantly varying more or less, the valve disks 13 of the different shut off valves are, during the operation of the boilers, in practically constant motion; and while this motion may be small it is quite sufficient to insure continued operativeness of the shut off valves, i. e., to insure against possible sticking of the valves due to their remaining stationary in an open position for a considerable period of time.

So far as I am aware, boiler cut off valves heretofore employed, when arranged for control from a distant point, i. e., from a point more or less distant from the cut off valve itself, have usually comprised more or less delicate pilot valve mechanism as a part of the main cut off valve, such pilot valve mechanism in most cases operated by an electromagnet or the like. Boiler cut off valves are in most cases and most desirably, located above the boiler and in about the position shown in Fig. 1. Valves so located are exposed to rather high temperatures; and to the dust and grit inseparable from coal fired steam boilers, and are also occasionally subjected to considerable shock such as may be occasioned by water hammer, or by priming of the boilers. It is obvious therefore, that it is highly undesirable to provide such cut off valves with pilot valve mechanism forming a part of or directly associated with the cut off valve.

So far as I am aware, I am the first to provide a boiler cut off valve with so simple operating means as a pipe 28 leading from one side of the valve-actuating piston or its equivalent, to a point, distant from the cut off valve itself, and convenient for attachment of a simple quick opening valve to be operated directly by the boiler attendant. Also, so far as I am aware, I am the first to connect controlling ducts of a plurality of pressure-operated boiler cut off valves, to a single master valve, by the operation of which all of the boiler cut off valves may be operated.

Referring now to Fig. 3, showing one form of master valve, susceptible of distant control, which I may employ: 33 designates the valve casing, having an inlet connection 34 and a discharge connection 35, and 36 designates a valve seat and valve-guide bushing located within the valve casing, the valve disk 37 being located within this bushing and arranged to seat against the valve seat 38 thereof. This valve disk 37 has a guide and actuating piston 39. 40 designates a spring tending to hold valve 37 closed; 41 designates a closure for the bottom of the valve casing 33 and the bushing 36; and 42 designates a pilot valve adapted to coact with a port 43 in the said closure 41 and thereby to permit valve 37 to open or close, according to the position of such pilot valve. This pilot valve is arranged to be actuated, in the construction shown, by a pivoted lever 44 engaged by a pin 45, itself arranged to be actuated by the plunger armature 46 of the solenoid magnet 47. It will be apparent that when said magnet 47 is energized and its plunger 46 raised, the pin 45 will be raised by such plunger armature, raising the lever 43 and so raising the pilot valve 42; and that when the magnet 47 is deënergized, parts 46, 45 and 44 will drop, so permitting pilot valve 42 to drop. Valve 37 has a piston face 48 of slightly less area than the upper piston face of the piston 39; consequently when steam or other fluid under pressure acts upon both the piston face 48 of valve disk 37, and the upper piston face of piston 39, there is a tendency, so far as the action of pressure upon these two piston faces is concerned, for the valve to open. This tendency is resisted by the spring 40 but that spring alone does not exert sufficient thrust to hold valve 37 closed. Steam or other fluid under pressure acting upon these piston faces, will leak past the piston 39 into the space below that piston, and, if pilot valve 42 be in closed position, will cause pressure to build up in the space below piston 39, so holding valve 37 seated; but when pilot valve 42 is opened and the pressure beneath piston 39 released, the excess of pressure exerted on the upper face of piston 39 over the counter pressure exerted upon piston face 48 of valve 37, will cause that valve to open. It will be seen that this master valve is a very simple and positively-acting electrically controlled valve, which will be caused to open by the closing of the circuit of its controlling magnet, and will be caused to close by the breaking of the circuit of its controlling magnet.

In Fig. 1 I have indicated a circuit 49 for this master valve, provided with a plurality of switches 50, by the operation of any one of which the circuit of said valve 31 may be closed and thereby the pressure in pipe line 30 relieved, so causing the various boiler shut off valves 6 to close. These various switches 50 may be located in various desirable locations; for example, one may be located at a conveniently accessible point in the boiler room; another in the engine room; a third in the superintendent's office, or, in case of a marine equipment, on the bridge; and still others may be located at other convenient points.

The facility with which the master valve 31 may be opened instantly, and closed as quickly immediately thereafter, makes the testing of my boiler cut off system a very simple matter, and makes it possible to test the same without interfering materially with the operation of the boiler plant or with the machinery or apparatus to which steam is supplied to that boiler plant; for by the closing of any one of the switches 50 all of the cut off valves 6 are caused to close instantly, such closure will be immediately apparent upon the pressure gages with which such boilers are provided, and a mere glance at such pressure gages will show whether all of the boiler cut off valves have operated, whereupon the switch 50 which has been closed may be opened again, thus immediately reopening all of the boiler cut off valves; and in practice this may be done so quickly as not to interfere with the running of an engine to which steam is supplied from the boiler plant, or without interference with the operation of other apparatus to which steam is supplied from the boiler plant. The boiler cut off valves 6 may also be tested individually, at any time, by opening the individual operating valves 29 of such boiler cut off valves.

It occasionally happens that it is desirable to have the boiler shut off valves closed automatically, in the event of some damage to the main steam line 6; such, for example, as the bursting of the main steam line or the accidental closing in some manner of the main steam line. For this reason I have provided the velocity-actuated contact device 7. The device 7 comprises a blade or paddle 51 within the casing of the device and in the direct path of the flow of steam, such blade being secured to a shaft 52 mounted for oscillation, there being on this shaft a lever 53 which on one side carries an adjustable weight 54 and on the other side is arranged to make contact with either of two circuit closers 55 and 56 adjustably mounted on the slide 57. These circuit closers 55 and 56 are connected to the same circuit 49 to which the switches 50 are connected. The adjustment of the blade 51 and shaft 52, and of the weight 54 on the arm 53, and of the circuit closing devices 55 and 56, with reference to the arm 53, is such that, when steam is flowing at proper velocities through the main steam line, such steam, actuated upon the blade 51, will move the lever 53 out of contact with circuit closer 56, without moving it far enough to make contact with circuit closer 55; but should the velocity of the steam increase greatly beyond that which is usual or customary, the blade 51 and arm 53 will be deflected far enough to actuate the circuit closer 55; likewise, should the velocity of the steam fall greatly below what is proper, the arm 53, swinging back, will actuate circuit closer 56; and when either of circuit closers 55 and 56 is actuated, as described, the circuit 49 will be closed, and the master valve 31 operated. It may be desirable to provide, in the circuit of circuit closer 56, a switch 58 which may be opened to nullify the action of circuit closer 56. This will be desirable, in particular, when starting up the engine or other apparatus to which steam is supplied by the boiler. When the velocity actuated contact device 7 is employed it will in general be desirable to employ an ordinary steam separator 59 in advance of such velocity actuated device 7, in order that, in the event of priming of the boilers, water may not be thrown against the blade 51.

I do not limit myself to the particular type of velocity-actuated contact device illustrated and described. It will be obvious that, as illustrated in Fig. 4, valves 29ᵃ arranged for electric or other distant control may be substituted in the pipes 28 for the hand operated valves 29 indicated in Fig. 1. In Fig. 4 the particular valves 29ᵃ illustrated are identical with the master valve 31, illustrated in detail in Fig. 3; but of course any valve adaptable for distant control may be used in lieu of the particular valve 29ᵃ illustrated; it will also be obvious that these valves 29ᵃ may be in the same circuit as master valve 31; also that a hand operated master valve 60 may be provided. It will also be obvious that, in lieu of the velocity-actuated contact device 7, for the control of the master valve, or the individual control valves 29ᵃ, or both, any other automatic controlling device may be employed, for example, a device operating when predetermined maximum pressures are reached, or predetermined minimum pressures are reached, or both. The construction of contact devices operated by rise or fall of pressure is too well known to require illustration here.

What I claim is:—

1. A boiler cut off system comprising in combination a plurality of pressure generators, a main conduit having connections to each of such pressure generators, and separate cut off valves, one for each such pressure generator, and each interposed in the connection from such main conduit to the corresponding pressure generator, said cut off valves each comprising fluid-pressure-actuated means for closing and opening such valves, a master valve, and cut-off-valve-controlling conduits leading from the fluid-pressure-actuated operating means of said cut off valves to said master valve, whereby by the operation of said master valve the said cut off valves may all be operated.

2. A boiler cut off system comprising in combination a plurality of cut off valves comprising fluid-pressure-actuated means for closing and opening such valves, a master valve, conduits leading from the fluid-pressure-actuated operating means of said flies alight on the inner side of the cones 11 by the operation of said master valve the said cut off valves may all be operated, another valve for each conduit leading from a cut off valves to said master valve, whereby by the operation of such other valve the corresponding cut off valve may be operated singly, and means for preventing back flow from the conduit of one cut off valve to a conduit of another cut off valve.

3. A boiler cut off system comprising in combination a plurality of pressure generators, a main conduit having connections to each of such pressure generators, and separate cut off valves, one for each such pressure generator, and each interposed in the connection from such main conduit to the corresponding pressure generator, said cut off valves each comprising fluid-pressure-actuated means for closing and opening such valve, a master valve, and cut-off-valve-controlling conduits leading from the fluid-pressure-actuated operating means of said cut off valves to said master valve, whereby by the operation of said master valve the said cut off valves may all be operated, said master valve comprising means for its control from a distant point.

4. A boiler cut off system comprising in combination a plurality of pressure generators, a main conduit having connections to each of such pressure generators, and separate cut off valves, one for each such pressure generator, and each interposed in the connection from such main conduit to the corresponding pressure generator, said cut off valves each comprising fluid-pressure-actuated means for closing and opening such valves, a master valve, and cut-off-valve-controlling conduits leading from the fluid-pressure-actuated operating means of said cut off valves to said master valve, whereby by the operation of said master valve the said cut off valves may all be operated, and means actuated by variation of conditions within such main conduit for actuating said master valve.

5. A boiler cut off system comprising in combination a plurality of cut off valves comprising fluid-pressure-actuated means for closing and opening such valves, conduits leading from the fluid pressure actuated operating means of such cut off valves, separate controlling valves for such conduits each comprising means for its operation from a distant point, and a single operating means for such controlling valves whereby all such controlling valves may be operated together.

6. A boiler cut off system comprising in combination a plurality of pressure generators, a main conduit having connections to each of such pressure generators, and separate cut off valves, one for each such pressure generator, and each interposed in the connection from such main conduit to the corresponding pressure generator, operating means for each cut off valve comprising means for the operation of that valve from a distant point, and means actuated by variation of conditions within such main conduit for actuating the operating means of said cut off valves.

7. A boiler cut off system comprising in combination a plurality of cut off valves, operating means for each cut off valve comprising means for the operation of that valve from a distant point, a conduit through which fluid under pressure may flow, and means actuated by variation of rate of flow within such conduit for actuating the operating means of said cut off valves.

8. A boiler cut off system comprising in combination a plurality of cut off valves comprising fluid-pressure-actuated means for closing and opening such valves, a master valve and conduits leading from the fluid-pressure-actuated operating means of said cut off valves to said master valve, whereby by the operation of said master valve the said cut off valves may all be operated, a conduit through which fluid under pressure may flow, and means actuated by variation of rate of flow within such conduit for actuating said master valve.

9. A boiler cut off valve comprising in combination a valve casing having a valve port therein, a valve proper adapted to open and close said valve port, said valve casing provided with a cylinder, fitting loosely within said casing, a piston within said cylinder connected to said valve proper to actuate the latter, spring-actuated retaining means for holding said cylinder in place, said cylinder and cylinder-retaining means located within a chamber of the valve casing having a normally closed space in rear of said retaining means, and a duct leading from such space and a valve for controlling flow through such duct.

10. The combination with a plurality of pressure generators, a main conduit into which such pressure generators discharge and a cut off system comprising a plurality of cut off valves each interposed between said main conduit and one of said pressure generators, each such valve comprising valve means arranged to close against fluid tending to flow from the other pressure generators or the main conduit into that particular pressure generator to which that valve means is connected, the said valve means of each such cut off valve arranged to be kept in vibration by variation of pressure in the generator which it directly serves as compared with the pressure in the main conduit, and fluid pressure actuated operating means for the valve means of the several cut off valves.

11. The combination of a pressure generator, a conduit into which such pressure generator may discharge, a cut off valve interposed between such generator and such conduit and comprising fluid-pressure-actuated operating means, a control conduit leading from such fluid-pressure-operating means to a point of convenient access, and a control valve connected to such conduit at such point of convenient access.

In testimony whereof I have signed this specification in the presence of two subscribing witnesses.

GEORGE W. COLLIN.

Witnesses:
LUCY B. NICHOLSON,
HENRY BISHOP.

Copies of this patent may be obtained for five cents each, by addressing the "Commissioner of Patents, Washington, D. C."

It is hereby certified that in Letters Patent No. 1,136,211, granted April 20, 1915, upon the application of George W. Collin, of Bridgeport, Connecticut, for an improvement in "Boiler-Cut-Off Systems," errors appear in the printed specification requiring correction as follows: Page 5, strike out line 9, and insert the words *cut off valves to said master valve, whereby;* same page, line 13, for the word "valves" read *valve;* and that the said Letters Patent should be read with these corrections therein that the same may conform to the record of the case in the Patent Office.

Signed and sealed this 11th day of May, A. D., 1915.

[SEAL.]                                       R. F. WHITEHEAD,

*Acting Commissioner of Patents.*